United States Patent
Simmons

[19]

[11] Patent Number: 6,057,509
[45] Date of Patent: May 2, 2000

[54] MODULARIZED ELECTRICAL BOX SYSTEMS

[76] Inventor: Michael L. Simmons, 8697 Point of Woods Dr., Manassas, Va. 20110

[21] Appl. No.: 09/071,881

[22] Filed: May 4, 1998

Related U.S. Application Data

[60] Continuation-in-part of application No. 08/714,252, Sep. 17, 1996, Pat. No. 5,874,692, which is a division of application No. 08/075,724, Jun. 14, 1993, Pat. No. 5,574,255.

[51] Int. Cl.[7] .................................................. H01H 9/02
[52] U.S. Cl. .......................... 174/53; 174/58; 174/17 R; 220/4.02; 361/641
[58] Field of Search ................................ 174/50, 53, 58, 174/17 R; 220/3.92, 3.94, 4.02; 361/641

[56] References Cited

U.S. PATENT DOCUMENTS

| | | | |
|---|---|---|---|
| 948,438 | 2/1910 | Ziegler et al. . | |
| 1,066,215 | 7/1913 | Murray . | |
| 1,456,385 | 5/1923 | Kvarnstrom . | |
| 1,534,723 | 4/1925 | Lewis . | |
| 3,364,330 | 1/1968 | Bassani | 200/296 |
| 3,424,333 | 1/1969 | Pimentel | 220/3.6 |
| 3,587,906 | 6/1971 | Pepe | 220/3.2 |
| 3,812,281 | 5/1974 | Boyer | 174/53 |
| 4,428,492 | 1/1984 | Jorgensen . | |
| 4,612,412 | 9/1986 | Johnston . | |
| 4,844,275 | 7/1989 | Schnell et al. | 220/3.9 |
| 5,509,560 | 4/1996 | Nash | 220/3.9 |
| 5,619,013 | 4/1997 | Jorgensen . | |
| 5,646,371 | 7/1997 | Fabian | 174/58 |
| 5,682,017 | 10/1997 | Marrotte | 174/53 |
| 5,810,303 | 9/1998 | Bourassa et al. | 248/205.1 |

*Primary Examiner*—Kristine Kincaid
*Assistant Examiner*—Dhiru R Patel
*Attorney, Agent, or Firm*—Laurence R. Brown

[57] ABSTRACT

A modularized electric box system provides a minimum of modular elements, typically two or three from which a basic anchor box may be formed with protruding members for support by a building body, and from which gangable extensions thereto may be fashioned. The modules may constitute a basic open front electrical box frame having at least one open side with interlocking structure for receiving and supporting either a sidewall panel or a gangable U-shaped extension box module. An anchoring box may be formed with anchoring structure integrally protruding from end panels thereof adapted for attachment to a building body. Thus minimally a basic U-shaped box frame module without sidewalls interlockable with a similar module and a removable sidewall module interlockable upon a U-shaped box frame at the open sidewalls will form a gangable box system. Interlocking channelwork permits unimpeded insertion and removal of modules by sliding movement perpendicular to the open box fronts. Thus, low cost retrofit installations may be made from a minimal inventory of parts to add one or more expansion boxes for creating a ganged system with little damage to the original wall site.

23 Claims, 6 Drawing Sheets

MODULARIZED ELECTRICAL BOX SYSTEMS

This is a continuation-in-part of co-pending application Ser. No. 08/714,252, filed Sep. 17, 1996, U.S. Pat. No. is now 5,874,692 which in turn is a division of Ser. No. 08/075,724 filed Jun. 14, 1993, now U.S. Pat. No. 5,574,255, Nov. 12, 1996.

TECHNICAL FIELD

This invention relates to modular electrical boxes, and more particularly it relates to electric box systems assembled from box forming modules including ganged box arrays which may be retrofit upon installed electrical boxes without additional support or requiring changes in the installed box wiring.

BACKGROUND ART

Modular electrical boxes which may be assembled from a set of modules either as single boxes or multiple ganged box systems are known in the art, as evidenced by U.S. Patents to J. S. Ziegler, et al., U.S. Pat. No. 948,438, Feb. 8, 1910, entitled SWITCH BOX OR CASING; M. Murray, U.S. Pat. No. 1,066,215, Jul. 1, 1913, entitled ELECTRIC BOX; A. T. Kvarnstrom, U.S. Pat. No. 1,456,385, May 22, 1923, entitled FUSE BOX; E. H Lewis, U.S. Pat. No. 1,534,723, Apr. 21, 1925, entitled SECTIONAL SWITCH BOX; J. J. Johnston, U.S. Pat. No. 4,612,412, Sep. 16, 1986, entitled ELECTRICAL OUTLET BOX ASSEMBLY and R. W. Jorgensen U.S. Pat. No. 4,428,492, Jan. 31, 1984 entitled GANGABLE HOUSING; and U.S. Pat. No. 5,619,013, Apr. 8, 1997 entitled GANGABLE ELECTRICAL BOX.

This body of art, however, is deficient for retrofit use in expansion of the volume of existing electrical boxes installed at a building site to incorporate additional electrical wiring by ganging on additional box modules, particularly when such modules must rely upon the existing box for primary in-site support. Existing boxes affixed to a wall are termed anchor boxes. Such boxes have anchoring structure protruding from outer box walls for securing the boxes in place to a building support body. In a typical embodiment, such structure provides for nailing the anchor box to a stud. In other embodiments structure protruding from the walls may serve to anchor the box into a cement base or other floor material. In retrofitting an expansion box module to an anchored box to laterally form a ganged box of greater internal volume, a removable sidewall is required for replacement of an expansion box module. In the prior art the available electric expansion box configurations require other protruding structure from the expansion box for separate anchoring of the added on boxes, and thus cannot rely primarily upon interlocking joint structure between boxes for supporting the expansion box upon the originally attached anchor box. In other words, the prior art capable of retrofit ganging, in general, requires each added box to be supported by flanges or fittings extending from the boxes to secure them to building elements such as a stud or lath or for bonding to surrounding floor materials and the like.

Furthermore, such prior art modularized boxes that permit a side to be removed for retrofit replacement of a ganged-on extension box for increasing the box volume must meet electrical code requirements for added electrical wiring or accessories. In general the box volume and support stability are critical. This prior art typically requires lateral access and large open workspace for mounting a ganged-in box, which generally requires screwing and unscrewing fittings or dismount and rewiring of the anchor box. Some boxes have no removable sidewall for installing a gangable extension box in its place. Thus, retrofit of existing wiring generally requires considerable damage and mutilation to former installation sites which require wall repairs and cosmetic refinishing in the retrofit process.

Thus, the installation process has been accompanied by excessive electrician time, expense and inconvenience, part of which constitutes repair and refinishing of the installation site after an expansion module is retrofit. Furthermore, in order to retrofit electrical systems in the field, electricians are often required to order special electrical box configurations, thereby adding installation time and cost to upgrading efforts. Alternatively, they must carry on a repair truck a large inventory of specialty boxes and fittings at considerable inventory cost.

Thus, it is desirable to have a minimum number of universally useful modules on hand for immediate synthesis of different required electrical box systems, including expanded ganged box arrays of various volumes. A minimal number of such modules is thus desirable from the logistics and inventory cost viewpoint to form both single boxes and ganged arrays in order to effectively and inexpensively do a reasonable range of electrical work. While the prior art has attempted to develop modules capable of a comprehensive range of electrical utilities, they have been deficient in providing effective modular structures as a convenience to the electrician and that reduce damage to wall sites when retrofitting expanded electrical service.

As further seen by analysis of the above related prior art, there is considerable waste of resources involved in upgrading existing electrical service by adding ganged boxes. Thus, for example, the prior art rarely provides a system that reuses rather than discards a side plate removed from a standard rectangular shaped electric box to gain access for rewiring and attachment of ganged extension boxes. With stringent waste disposal laws and the necessity to salvage scrap materials, a better solution would be the development of a modular system that reduces waste.

It is accordingly a general objective of this invention to improve the status of the electrical box arts by elimination of the foregoing problems.

It is a more particular objective of the present invention to provide modular electrical box systems that are particularly advantageous for retrofit expansions of electrical service in material and labor costs, and which minimize damage to wall-sites and premises surrounding an electrical box that is being retrofit for added electrical service.

It is a primary object of this invention to provide the electrician with electrical box modular systems that will reduce installation and inventory costs both in initial electrical service installations and retrofit upgrading installations.

Further objects, advantages and features of the invention will be found throughout the following description, claims and accompanying drawings.

DISCLOSURE OF THE INVENTION

This invention accordingly provides the electrician modular electric box systems constructed of a minimum number of standard modules, which have novel structural features reducing material and inventory costs as well as reducing installation time and after installation repairs. These objectives are achieved by systems requiring few basic modular elements for creating electric box configurations operable for a wide range of retrofit upgraded service installations at lower cost.

Modular elements are desired for use both as individual boxes and in creation of expanded electrical service configurations as well as retrofitting existing electrical installations. Thus, a small family of modules has each of the modules configured for mating and disassembly of mutually supported joints formed and taken apart by movement of modules inwardly and outwardly in a direction perpendicular to the open front and closed back of an electrical box, without lateral movement. Additionally, all box interlocking structure is made accessible from the open box front. Thereby, retrofit installations may be made without requiring a screwdriver or hammer, for example, to lodge and dislodge screws, nails and such fasteners after an access hole in a wall is made large enough. Thus, this invention reduces damage to existing anchor box sites by eliminating the requirement to enter or remove system modular parts or fasteners by lateral access outside the box sidewalls.

The modular elements integrally carry mating interlocking slide joint structure, such as tongue and groove channelwork, adapted for interfitting modules together and capable of primarily supporting gangable modular extension boxes upon an existing anchored electrical box. Thus, to expand box volume by ganging, typically a removable sidewall panel may be removed from an anchored box, a mating U-shaped extension box inserted in its place and the removed sidewall panel replaced as a closure side on the extension box. For such installations, the invention is embodied in systems requiring few basic modular elements that need be tooled and stocked for universal use in synthesizing electric box systems. Typically such ganged box arrays interlock together basic U-shaped box frame modules and side panel modules. In some cases additional structures such as protuberances may be added to the modules, extending outwardly from the box end walls, for example, for functioning as mounting structure for securing selected modules to a building support body, or for other purposes.

Various configurations of the invention having particular advantages are set forth in the following description and the accompanying drawings.

BRIEF DESCRIPTION OF THE DRAWINGS

In the drawings, wherein like reference characters found on the different views relate to similar features.

THE PREFERRED EMBODIMENTS

Figure 1:
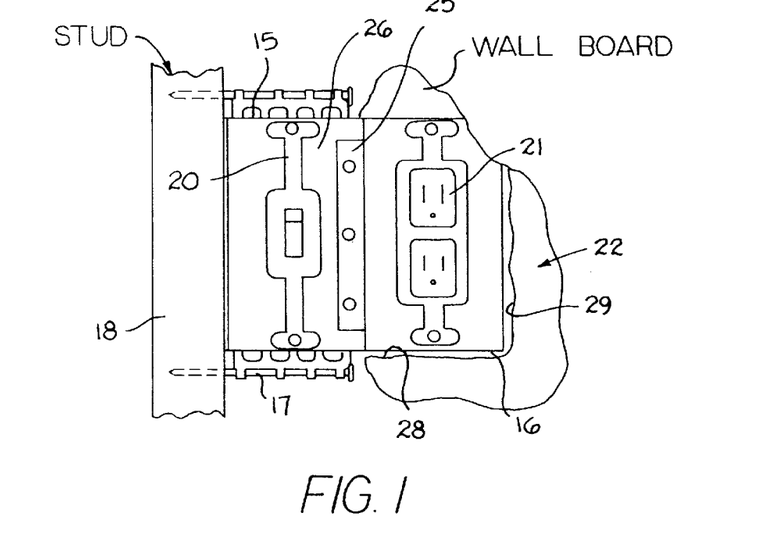
FIG. 1 is a front view sketch, partly broken away, of a two gang electrical box retrofit installation in a side wall of a building.

As seen from FIG. 1, two quadrilateral open-front, closed-back modular electrical boxes, namely the anchor box 15 and expansion box 16, are gang mounted laterally side-by-side in a two-gang electrical box configuration. This substantially doubles the interior volume of the anchored box and thus under appropriate electrical codes permits the addition of further electric wires. The anchor box 15 has protruding outwardly from the upper and lower box walls anchoring support structure for retaining nails 17 driven into the stud 18 for anchoring the ganged assembly in place. Thus the ganged expansion box 16 is primarily supported by the interlocking structure between the anchor and expansion boxes 15 and 16, and thus, unless several gangs are added requires no supplemental support structure on expansion box 16. Typically, switches 20, plugs 21 or other accessories may be wired in the ganged extension box 16, without dewiring the anchored anchor box 15. Such accessories are held in place by conventional flanges at the the open box fronts, which are positioned flush with the front surface of the wall 22 to receive conventional cover plates. The boxes in this embodiment are typically made of sheet metal.

For meeting electrical codes, the ganged expansion box 16 is electrically connected to the anchor box 15 by means of at least one bonding screw in the screw-mount panel extension tab or flange 25 on expansion box 16 which is also thus affixed to the rear closed panel 26 of the anchor box 15 for mechanical support supplemental to that provided by the interlocking joint structure between the two boxes. This mounting structure is constructed so that it requires access only from the front of anchor box 15, without removal of the expansion box 15 or its wiring, and has no fasteners that need to be accessed laterally from outside the box. Furthermore, no lateral movement of the modular elements is required to mate the two boxes into a ganged box array of higher internal volume. Conversely, the boxes have appropriate front-to-back sliding channelwork forming interlocking joint structures between the boxes.

To retrofit the ganging of expansion box 16 to anchor box 15, the wall board need only be removed up to borders 28, 29 contiguous to the expansion box 16 sidewalls, thus leaving enough room to move the expansion box 16 into place by inward front-to-back movement perpendicular to the back panel. Any addition al retention screws in flange 25 may be insert ed (or removed) from the front panel. Typically, the boxes and sidewalls are added and removed with a sliding tongue and groove interlock joint without lateral movement. Thus, the wall board need not be further disfigured for fitting the ganged expansion box 16 into place. Only expansion box 16 supplying additional service need be wired. Thus, little installation labor is required for electrical work or for wall repairs.

Contrast that simple, low labor, low cost, non-disfiguring installation made possible by improved box structure with the conventional manner of extending electrical service by installing one or more laterally ganged boxes. As may be seen from the nails 17, to remove the previously installed anchor box 15, the wallboard of wall 22 would have to be disfigured enough to permit a tool to remove nails 17 and anchor box 15 and to replace it with a two-ganged box, which would have to be wired in entirety with the original wiring pattern of the initial anchor box 15. Clearly the invention has avoided repairs to the wall and has simplified the method of extending electrical service by retrofit ganging of additional boxes to eliminate the formerly required steps of disfiguring and restoring the wall- about the installation, and of replacing and rewiring an originally anchored box.

Figure 2:
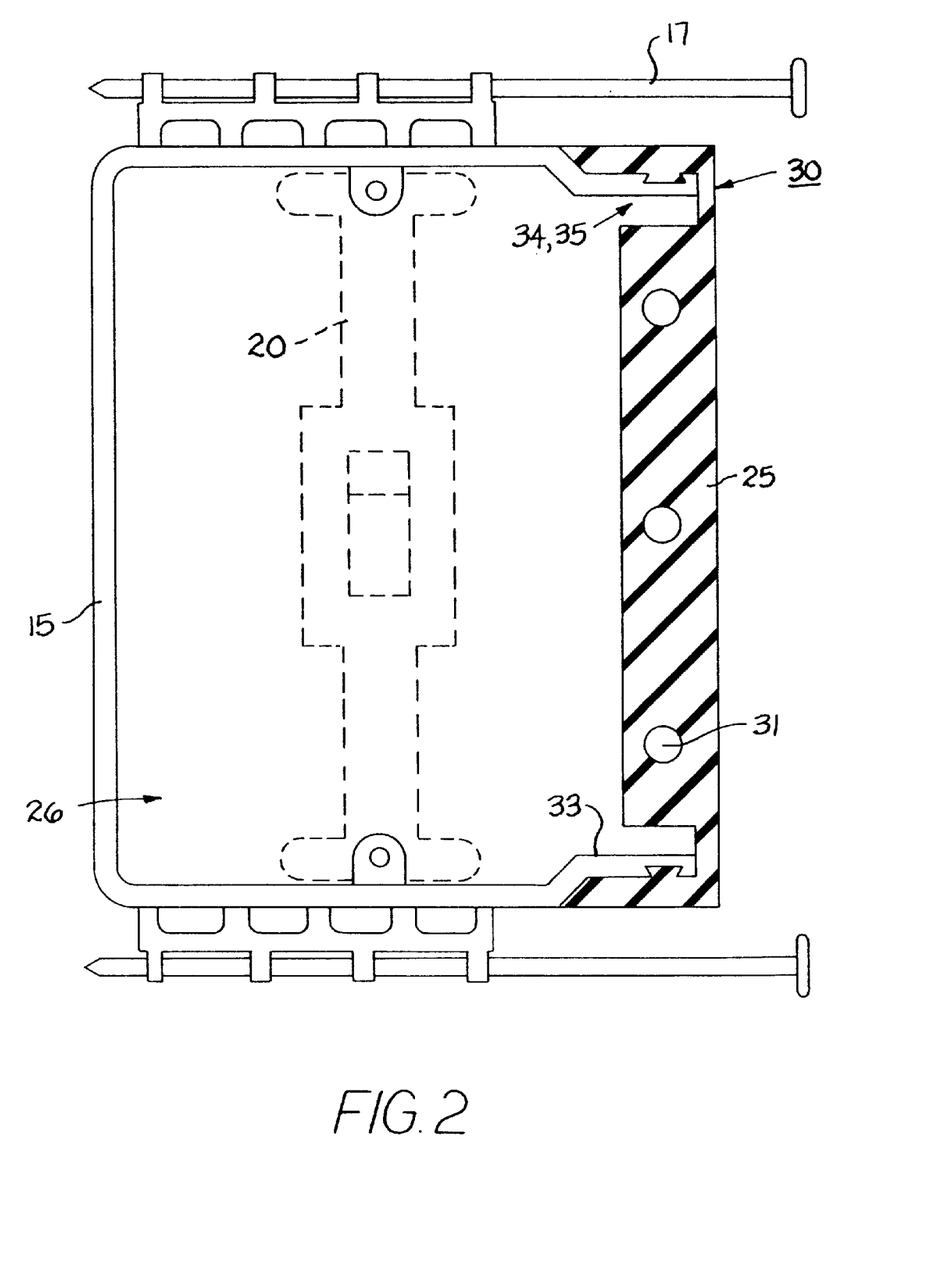
FIG. 2 is a view looking towards the open box front of a modular box configuration provided by the invention having one open sidewall and externally protruding structure for securing the box to a building support body.

In FIG. 2, a molded plastic anchor box 15 construction is shown with a mated removable sidewall in place. The hatching represents a cross section through the replaceable plastic sidewall end plate 30 in a plane parallel to and adjacent to the closed rear wall panel 26 of the anchor box 15. Thus, the box is not necessarily limited to a metal stamping, but may be of molded plastic. The flange 25 has three screws 31 for firmly affixing the end sidewall plate 30 to the anchor box 15 for support supplementing that of the interlocking joints so that this panel or a corresponding mated gangable expansion box will be supported by the original anchor box. The interconnection joint between the added module and the anchor box 15 extends perpendicular to the rear box walls in the interlocking tongue and groove channelwork comprising the mated ribs 34 on the added module and channels 35 on the anchor box open side.

In this embodiment the overlapping flanged ends 33 on the anchor box and the mated wing flanges of the added module further strengthen the mechanical support afforded by the interlocking joint in forming a closed box. Thus the pair of tongue and groove members ribs 34, channels 35 in the outer box corners extend from the back of the box toward the open front to form an interlocking joint at these box corners with the tongue and groove rib and channel members 34, 35 disposed in the overlapping flange arrangement forming substantially closed box sidewall structure.

Similar interconnecting structure is provided for retrofitting gangable boxes after removing the sidewall end plate 30. The ribs 34 and channels 35 thus provide in accordance with this invention channelwork structure for mounting and supporting modular attachments to the anchor box 15. Such modular attachments are attached and removed from the open-front of the anchor boxes without requiring any lateral access in the fitting or securing of added modules in place, as is required in prior art systems and methods.

Figure 3:
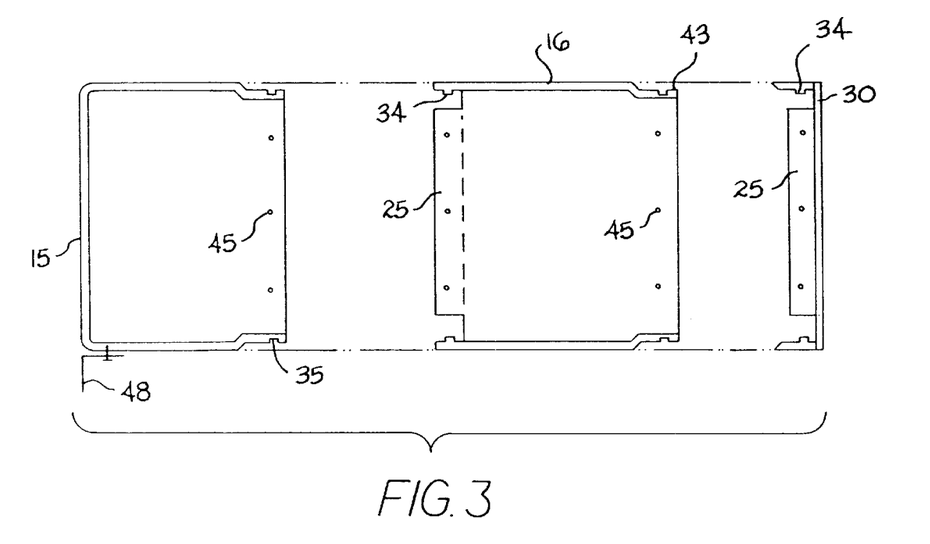
FIG. 3 is an exploded view sketch front view of a multiple gang electrical box assembly afforded by the invention, typically formed of metallic sheet material.

In FIG. 3 the exploded view illustrates typical structure of the gangable expansion boxes 16 providing the ability to mount and support further gangable boxes in the aforesaid manner affording expedited electrical retrofit installations. Thus on the gangable expansion box 16, the right end flanging 43 and screw access holes 45 are similar to those of anchor box 15 which mates with either an end plate 30 or a further similar gangable expansion box 16. No anchor box anchoring attachments 48 are necessary for anchoring further ganged boxes mounted on an anchored box since the interconnecting structure provides the primary mating and mechanical support functions for a reasonable number of added gangable boxes.

The improved box ganged structure of this invention therefore affords a novel method of retrofitting electrical boxes with the savings of time, labor and inconvenience in retrofitting gangable boxes of this invention to an already installed interfitting anchor box. The simplified steps of cutting out only enough wall to receive one or more gangable extension boxes and mounting these boxes with access only to the anchor box front opening while the anchored box remains in place without any requirement for removal or rewiring.

It is to be noted that the overlapping flanges on the back panel of metal boxes heretofore described is significant in meeting electrical codes, which require positive grounding of adjacent ganged metal boxes and electrical interconnection of the boxes to avoid shock hazards. Thus, bonding screws can be used (31, FIG. 2) to assure that extension ganged boxes are electrically connected together. That electrical connection feature however is not necessary in the plastic box embodiment of the invention hereinafter discussed.

Thus, this invention provides modular elements for producing various electrical box configurations including ganged box systems by mating at least two interfitting modules for assembling into a substantially quadrilateral four-sided open-front, closed-back electrical box assembly of a predetermined interior volume. One typical such interfitting basic module is an electrical box frame capable of receiving ganged structure mated thereupon and having a closed back and at least one open side structured for receiving a removable interfitting module. Typically this module is a substantially U-shaped box frame (16, FIG. 3) to which sidewalls and gangable expansion boxes are mated. Another such basic interfitting module is a removable electrical box sidewall end plate (30, FIG. 3) mateable on an open side of the electrical box frame module to form therewith a unitary stably supported structure.

For mating these typical modules novel mating interlocking structure is provided which overlaps two mated modules for producing a unitary electric box configuration of stably mated and supported modular construction. The interlocking structure is typically rib and groove channelwork having respective tongue and channel members integrally supported by overlap with mating structure on respective mated modules located adjacent open mating sides of the electric box frame. This channelwork serves to mechanically support added modules by forming overlapping mechanically stable joints along the sidewall joints and the backwall joints at the closed back of the electric box, all being accessible for installation and removal from an open box front. This channelwork structure slidably engages and disengages by movement in a direction perpendicular to the closed back of the electrical box frame.

Furthermore the channelwork forms a detenting or locking function of securing modules into a unitary box array at least in part by frictionally holding and detenting the two modular units together as a unit. The locking function may be fortified by screw fasteners installed and removed from the open box front, but in the embodiment of FIGS. 4 to 8 is achieved by elastically deformable detent structure.

Figure 4:
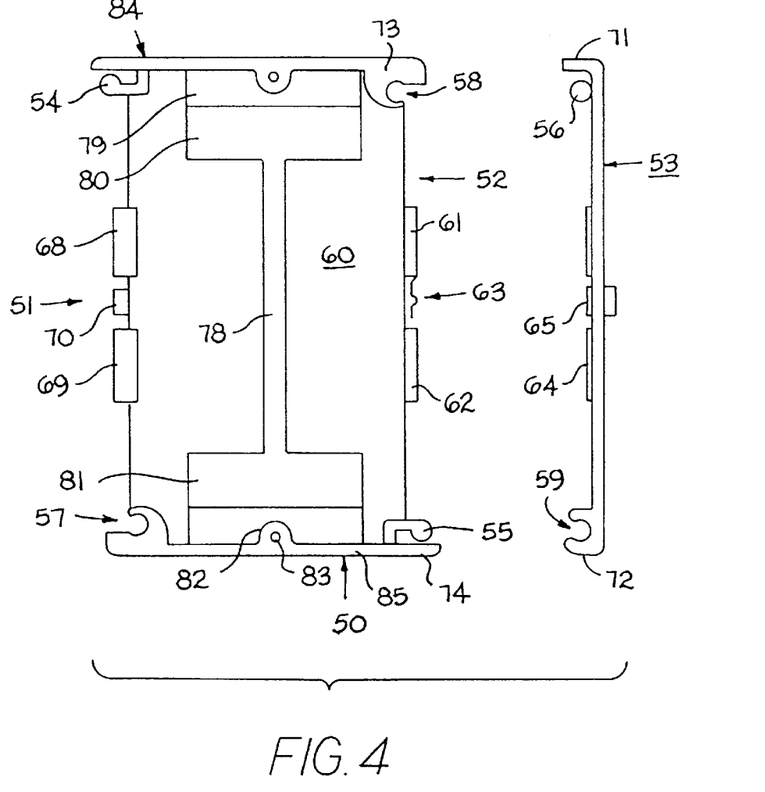
FIG. 4 is an exploded view of two basic modules for assembling electric box systems including ganged arrays, looking into the open box front, of a molded plastic embodiment of the invention showing mating interlocking structure integrally attached to the U-shaped electric box frame module and sidewall modules, and overlapping support structure disposable on the back wall of the box frame module and back edge of the sidewall module.

This embodiment illustrates a set of two modules 50, 53, providing further features while retaining the same advantages and features hereinbefore discussed. In particular this embodiment provides for the electrician a minimal set of modules to be carried in stock, from which a variety of electric box systems may be created such as the aforementioned ganged box arrays. This embodiment provides the further improvement over conventional prior art electrical boxes in that there are no waste parts to be discarded, particularly in the retrofit electrical wiring arena, thus producing economic and environmental advantages.

In the view of FIG. 4 looking inwardly into the open box front, the U-shaped electrical box frame module 50 has open right and left sidewalls 51, 52, upon either of which the removable sidewall panel module 53 may be attached. Single boxes, or multiple ganged box arrays without interior partitions may be assembled from the two modules 50, 53 by interfitting together two or more box frame modules 50 and attaching sides 53 to opposite open sidewall panel modules.

These two modules, the U-shaped electric box frame module 50 with open sides 51, 52 and the removable sidewall panel module, 53 permit the electrician to form either standard one tier boxes or several tiered box arrays Thus the modules may be used either for initial installation or for retrofit installations. This achieves the objective of minimizing inventory costs and assuring the electrician that a variety of different specialty electrical boxes, such as two ganged or three ganged boxes, need not be stocked or be procured at the time of need, but may be formulated from these basic modular elements.

The open front U-shaped electrical box frame module 50 adjacent its two open sides 51, 52 in the respective b ox corners has integrally attached tongue and groove interlocking channelwork structure for receiving and supporting in an assembled unitary configuration further modular elements on the open sides. These modular elements may be either box frame modules 50 or removable sidewall modules 53 so that single boxes and ganged boxes alike may be assembled. Thus, with a sidewall panel module 53 inserted into each open side 51, 52, a substantially rectangular self standing electrical box with closed sides is formed. A ganged box array without internal dividing walls is similarly formed by attaching two or more U-shaped box frames together before closing the opposed open sidewalls with the sidewall panel modules 53.

The interlocking structure for assembly of modules upon the box frame module 50 for support thereby, contains channelwork including generally cylindrical tongue members, 54, 55. A corresponding tongue member 56 is located on the sidewall panel module 53. These tongue members mate by sliding together into corresponding axially aligned cylindrical receptacle groove members 57, 58 on the box frame 50 and 59 on the sidewall module 53. The channelwork is so aligned with axes perpendicular to the back panel 60 of the box frame 50 that it restricts movement, either for installation or removal of modules, into a direction perpendicular to the open electrical box front and back panel 60 and parallel to the side walls. There is no accompanying lateral movement nor obstruction of axial movement of the interlocking structure being moved into or out of its mated position.

Thus, the sidewall panel module 53 mates into the box frame open side 52, as shown, and if reversed top to bottom at the opposite open side 51 will mate thereinto. Similarly a further box frame module 50 could be inserted between that shown and the sideplate 53 to form a two ganged array with expanded box volume. That is important in meeting electrical code requirements for specified volumes per wire entering the box. In this manner, the retrofitting of an installed box to add one or more wires usually requires an increase in box volume. The adding of a U-Frame module 50 therefore expedites the retrofitting by significantly reducing electrician cost, time and trouble since the existing wiring need not be unwired to be rewired inside a larger size ganged box, as required in the prior art.

Figure 8:
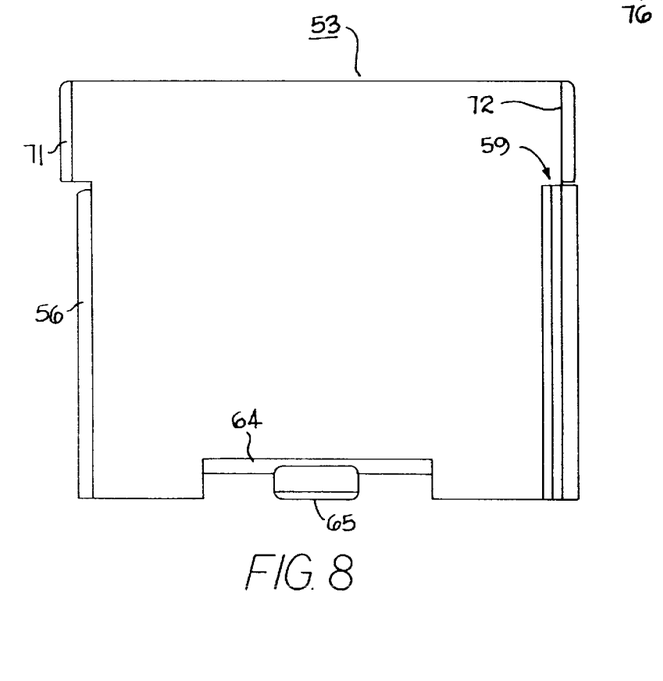
FIG. 8 is a plan view of a sidewall panel module, looking outward from inside the electrical box, showing interlocking structure along a significant portion of the box height and load supporting joint strucure at the bottom which overlaps the bottom panel of a contiguous assembled U-shaped box frame module.

The back panels 60 of box frame module 50 at the contiguous open sidewall mating edges form an overlapping support and detenting joint structure (61-65) between contiguous modules for retaining them in engagement for normal use as a unitary assembly. In this respect, the box frame module 53 has on its right bottom edge protruding upwardly extending ridges 61, 62 and a detent indentation 63. By engagement with and overlap of this edge with the corresponding detent elements 64, 65 of the sidewall panel module 53, the modules mate and form a unitary configuration. At the bottom edge of the sidewall module 53, as shown in FIG. 8 seen looking outwardly into the box sidewall, the overlapping protrusions carried by the sidewall panel module 53 include the central detent tab 65 and straddling tabs 64. The central detent tab 65 mates into the recessed detent indentation 63 into the sidewall of the bottom plate 60 of the box frame module 50 (as seen from FIG. 5). The detent tabs 64, when the central detent tab 65 is detented, overlay the ridges 61, 62 extending upwardly from the back panel 60 of the box frame module 50, thereby restricting lateral movement of the endwall flange plate at the back panel of the box. The flexibility of the plastic material forming the box permits flexure of the detent tab 65 as the sidewall panel module 53 is moved inwardly into its supported and detented seat to thereby restrict upward movement of the sidewall back panel 53 by vibration or other normal external forces bearing upon the sidewall panel module or box back panel 50 below its detenting force. Thus the two contiguous modules 50, 53 are mechanically supported in a unitary modular configuration by the overlapped snap-fit detent join formed by flexing the plastic box structure. This joint can be closed and opened by overcoming manual force applied in the mounting-dismounting directions perpendicular to the back panel 60 or open box front.

Corresponding mating overlap and detenting structure is carried on the left edge of the back panel 60 of the box frame module 50, with detent members 68 and 69 and detent tab 70 being integrally molded onto the plastic box structure.

At the upper end of the sidewall panel module 53, the folded over wing flap 71 is positioned above the tongue receiving cylinder groove member 58, and thus fills a corresponding slot 73 on the box frame module 50, resting upon the top extremity of the groove member 58. The tongue member 56 and groove member 59 structure of both modules 50, 53 is foreshortened and contained in the lower portion of the box frame module in mated position, extending to abut in registration with the back panel 60 at the box 50 open sidewall.

Figure 6:
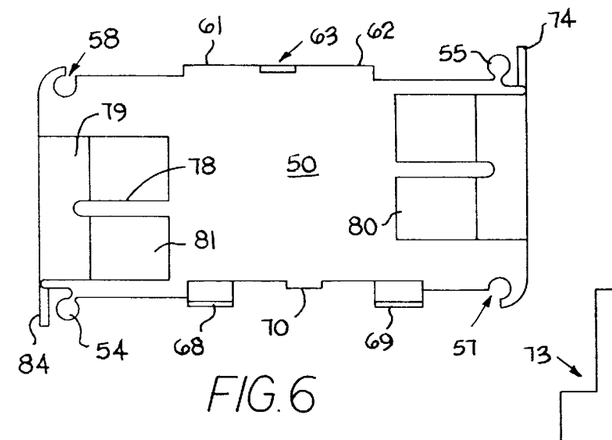
FIG. 6 is a bottom view of the U-shaped box frame module shown in FIG. 4 illustrating overlapping support structure at the opposite open sides disposed on the bottom panel.
Figure 7:
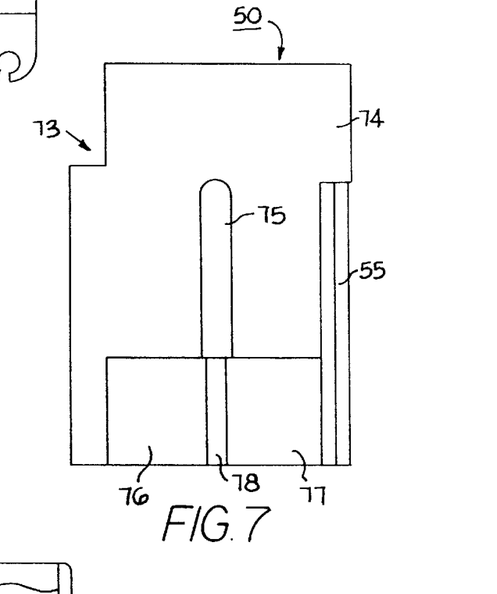
FIG. 7 is an end view sketch looking into the left end of the U-shaped box frame module of FIG. 6.

As visualized from the end view in FIG. 7 of the box frame module 50 and the sidewall module 53 in FIG. 8, there is a foreshortened lateral flange 71 on the sidewall module 53 which abuts the module 50 end panel lateral tab flange at corner 73 extending above the tongue receiving cylinder of receptacle groove member 58. In that end view, there are inwardly directed indentations 75, 76, 77 and an extending rib 78 seen also protruding from the back of the box module 50 corresponding to like structure seen in the side view of FIG. 5 and bottom view of FIG. 6. The indentations 76, 77 are set back by the distance of plateaus 79 extending upwardly from the box back panel 60, and slant inwardly toward the back panel 60 along the panels 80, 81 at either end of the U-shaped box frame modules 50. Upon the plateaus 79 extend the cylindrical posts 82 with a screw receiving hole 83 for securing cover plates thereto in the conventional manner. These indentations 75, 76, 77 and extending rib 78 give strength and stability to the end plastic walls 84, 85 of the U-shaped box frame module 50, which is overall wise substantially an open front rectangular parallelepiped.

Figure 5:
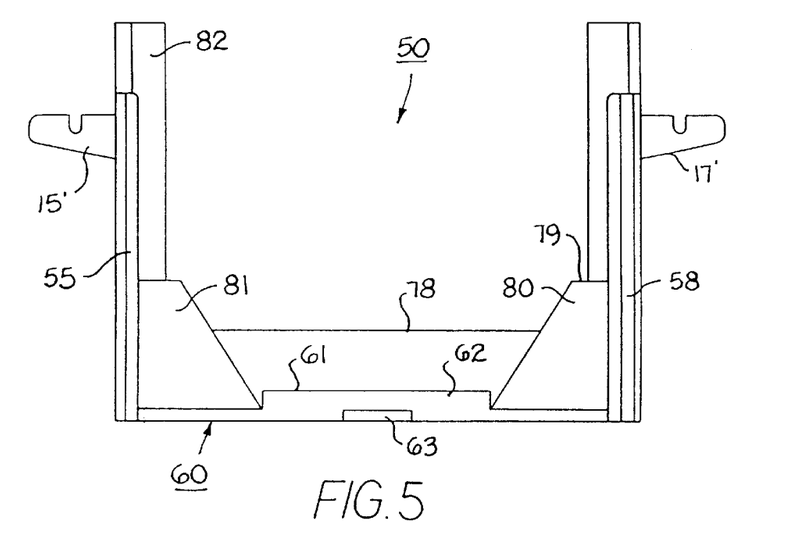
FIG. 5 is a side view of a U-shaped electric box frame module, such as shown in FIG. 4, having attached integrally thereto added anchoring structure suitable for nailing the box frame to a building element such as a stud.

In the side view of the U-shaped frame box module 50 of FIG. 5, the supporting structure on the back panel 60 is shown in relationship to the foreshortened generally cylindrical tongue member 55 and groove member 58 interlocking joint members. In this view, nail holding structure 15', 17' for anchoring the box to a stud extends from and is integrally secured as a series of spaced plastic panel members molded upon the respective end walls. In such a plastic box these anchoring members typically comprise three or four spaced panels with open notches alternating to open on upper and lower notch faces for snugly receiving a nail of a particular size. The nail is preferably slanted outwardly towards the head, as better seen in FIG. 9, to provide room for hammering it into a stud for firm enough support for this specialty anchor box module to primarily hold and support ganged extension boxes in a ganged array.

In the bottom view of the U-shaped box frame module 50 shown in FIG. 6, the arrangement of the interlocking structure on the box module shows four rectangularly arranged interlocking tongue and groove member, pairs 55, 58 and 54, 57 of which being located on each side comprising respective male and female interlocking members. Each pair of members disposed toward opposite ends of the box respectively comprises male and female interlocking members, thus arranging two male members and two female members kitti-cornered on the frame module.

Figure 9:
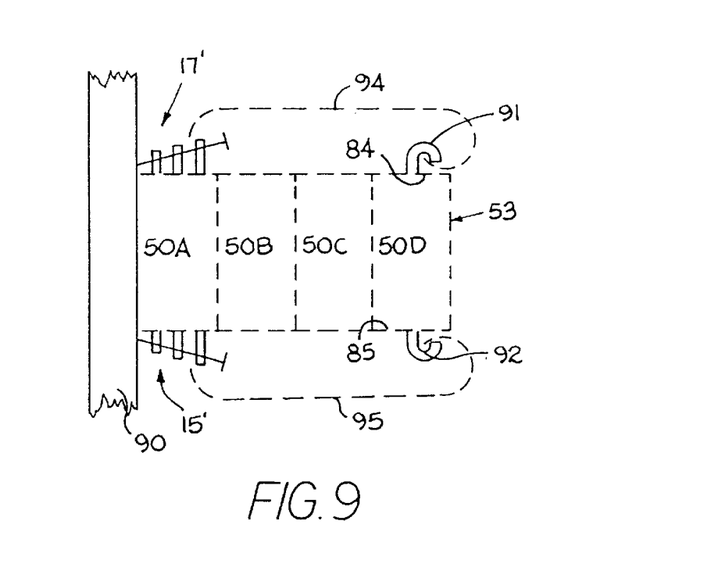
FIG. 9 is a sketch of a ganged array with a wire receiving hook attachment integrally disposed to protrude outwardly from a specially molded U-shaped frame module for supplementally receiving bracing guide wires extending to an anchoring position on a building stud.

In FIG. 9, an array of an anchored electric box 50A with three expansion boxes ganged thereto, namely 50B, 50C, and 50D representative of three intermediate U-shaped frame modules 50 attached to the anchored box 50A and closed on the right extremity by the sidewall panel module 53. The anchored box 50A is shown to have the anchoring structure 15', 17' thereon, with nails attaching the box to a stud or equivalent building element.

Note that expansion box 50D has integrally located on its end walls 84, 85, and extending outwardly therefrom the hook members 91, 92. This permits a guy wire, shown schematically in dotted lines 94, 95 to be attached for anchoring to either the building stud 90 or some other building element for adding supplemental support to the ganged array. In retrofit installations, the guy wires 94, 95 may be attached to the anchoring structure 15', 17', as shown by way of example. In most cases the supplemental anchoring is not necessary, but for larger, longer ganged arrays, supplemental support may be desirable, as it may also be if there are any outside forces on the boxes such as the presence of unduly heavy accessory loads or contiguous wiring in contact with the ganged array or mechanical vibration.

Figure 10:
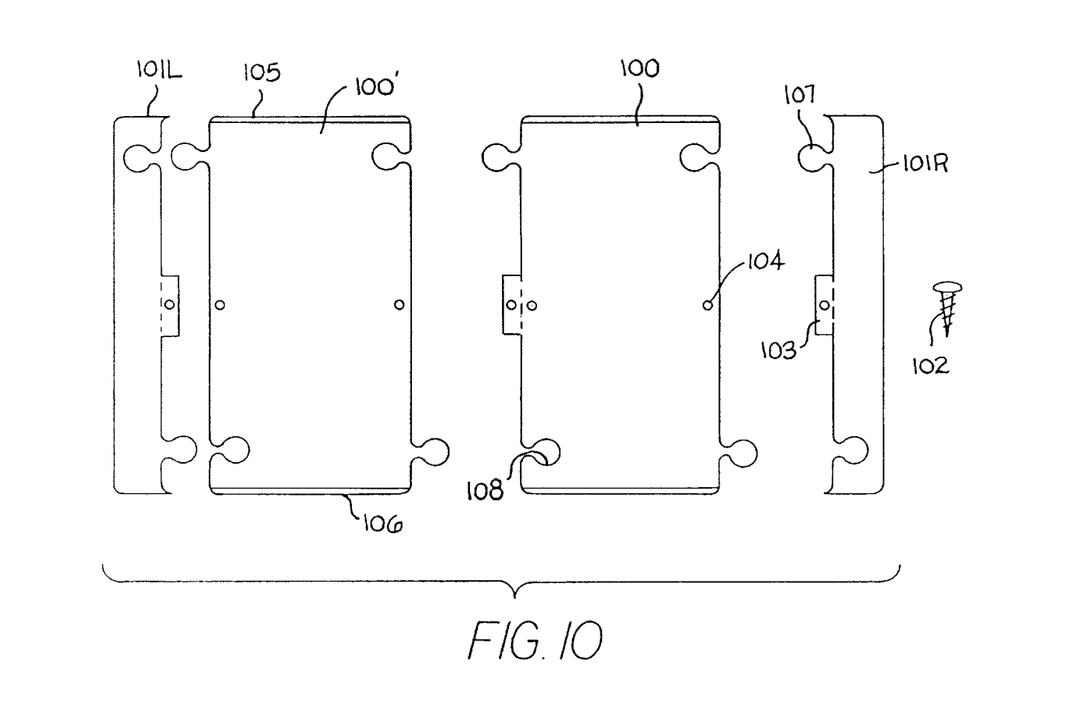
FIG. 10 is an exploded sketch looking towards the open front of a gangable box array, typically metallic, formed of only two basic modules, namely side panels and U-shaped, open-front electric box frames with two open sidewalls.

In FIG. 10, the exploded view shows two basic modules 100, 101 from which either single boxes or ganged arrays may be constructed. This is shown typically as a metallic box, for which the bonding screw 102 is used to assure a secure electrical connection between joined modules as inserted for example to secure tabs 103 to the guide holes 104 in the back panel of the U-shaped box modules 100. The box module 100' is a modification of box module 100 with the tab broken off, which provides an appropriate single box body or the first of two or more ganged boxes. Those box bodies thus have two open sidewalls from which an open front box is formed when modules 100 and 101 are mated. The resulting four sidewalls include the removable sidewall modules 101L at the left and 101R at the right, together with the end two sidewalls 105, 106.

The modules are mated by way of front to back journalled, slidable tongue 107 and groove 108 channelwork. It is noted that the tongues 107, and grooves 108 are alternated top-to-bottom and left to right so that the sidewall modules 101 can fit at either side of the box, and thus with a break off tab 103' on the boxes, only two modules need be tooled and stored in inventory for creation of universally usable single/ganged box arrays. The front-to-back sliding joints thus provide the advantages hereinbefore described over the prior art such that no lateral movement of a mating is necessary for installing an additional box body 100 or sidewall 101. Thus, a removed sidewall 101 from a single box may be reused at the far end of an expanded ganged array to avoid waste and reduce cost of materials and inventory.

Figure 11:
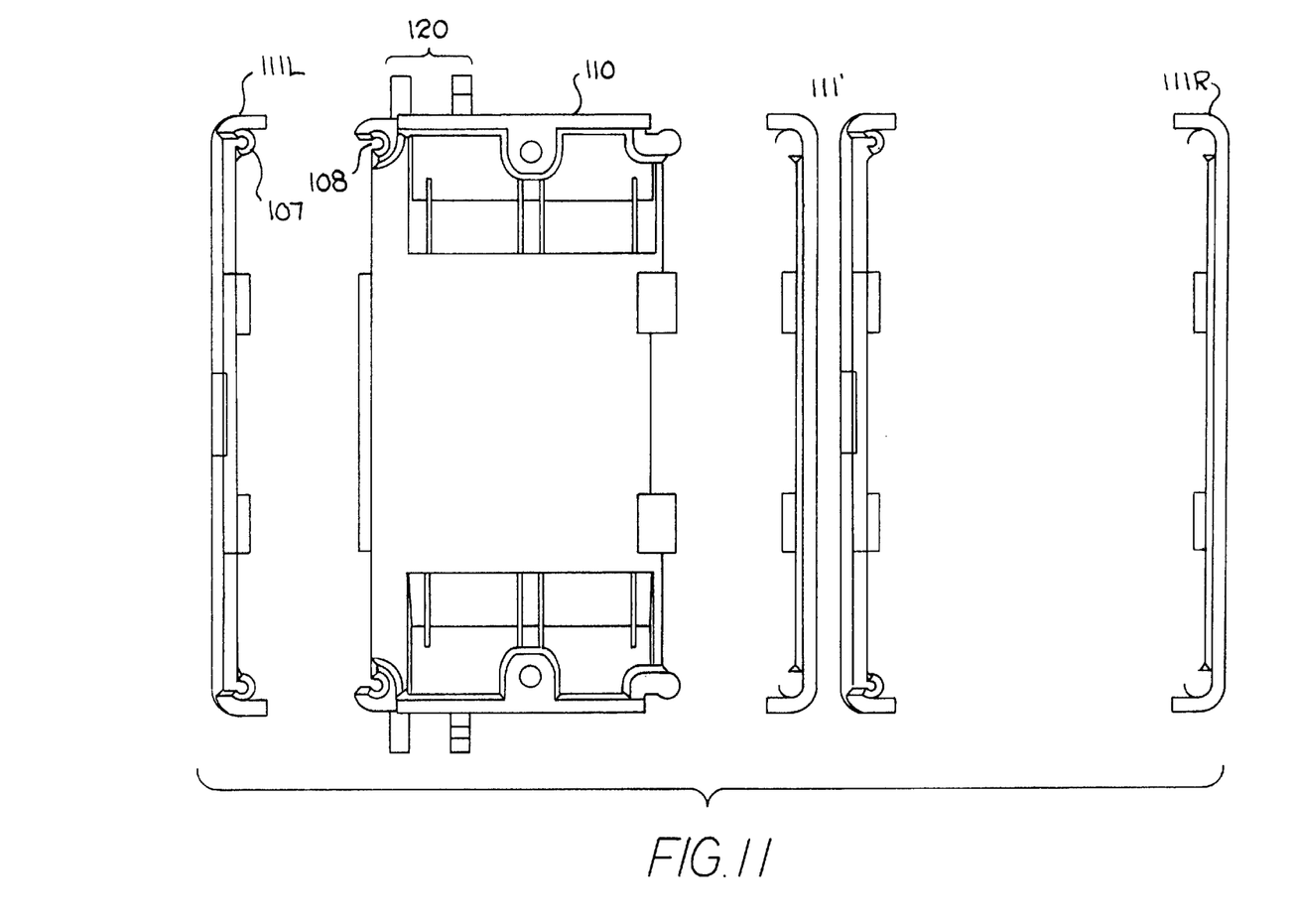
FIG. 11 is an exploded sketch of a modular ganged box system formed of typically molded plastic modules, which can provide an intermediate partition within the ganged box array and wherein the illustrated anchor box has specially molded protruding support structure for nailing the box to a building support stud.

In a similar manner the FIG. 11 embodiment of the invention is a molded plastic electrical box, which could have reversible sidewall plates but which can also be in the shown channelwork embodiment wherein two different sidewall plates 101L and 101R are required. Thus, three modules 110, 111L, 111R are necessary for tooling and inventory in this embodiment. A fourth back-to-back sidewall plate module 111' provides for an intermediate partition affording closed sidewalls between ganged boxes for those applications that do not require more box volume because of addition of extra wiring. The single shown U-shaped, open-sidewall, box frame member 110 is made as an anchor box for attachment to a stud by nails through the integrally attached anchor structure 120 at the top and bottom left side of the frame member 110.

This embodiment of the invention corresponds to the embodiment of FIGS. 4 to 8 except for the intermediate partition module 111' and the different distribution of the channelwork tongue 107 and groove 108 members so that the box frame member 110 has groove members 108 on the left side top and bottom corners, and tongue members 107 on the right side top and bottom corners. Thus mating sidewalls 111L and 111R respectively mate and unmate by the aforesaid front-to-back sliding action on the left and right sides of the box frame member 110.

In these plastic molded embodiments of the invention, therefore, the mating interlocking structure comprising tongue and groove channelwork overlaps the two modules for forming therefrom a unitary stably supported electrical box array. The channelwork tongues and grooves are integrally supported by respective nested modules about an open side of an electric box frame module to form a mechanically supporting joint extending to the closed back of the electric box. The friction of the tongue and groove interlocking channelwork serves to hold two mated modular units in a unitary combination. Further elastic detent structure at the back of the box also serves as securing means to further prevent outward movement of a sidewall panel or extension box from the mated position.

In a plastic box, retainer screws may be replaced by an elastically flexible snap-fit detent joint of a nature that may be overcome manually for mating and removing modules at a sidewall location. In a metal box it is preferable to overlap a flange to be secured to the back of the box by a bonding screw. In any event, all mounting and demounting hardware is to be accessible from the open front of a box thereby avoiding behind-wall fasteners that require access and are disposed along a lateral axis to the tongue and groove axes.

In general very few basic modular parts are required, but in some cases, the basic parts can be altered to supply anchoring structure, for example, or some other desirable specialty feature.

Therefore, having introduced novel electrical boxes with improved functional performance into the art, those features of novelty set forth in the following claims encompass the spirit and nature of the invention.

What is claimed is:

1. A gangable modular electrical box configuration, comprising in combination, at least two interfitting modules for assembling into a substantially quadrilateral four-sided open-front, closed-back electrical box assembly of a predetermined interior volume, a first one of said at least two interfitting modules comprising an electrical box frame having at least one open side and a closed back, and a second one of said at least two interfitting modules comprising a removable electrical box member having sidewall structure mateable on said open side of said first one of said at least two interfitting modules to form said unitary stably mated structure, and mating interlocking structure overlapping at least said first and second of said at least two interfitting modules for interfitting said first and second modules for forming therefrom said unitary stably mated structure, said mated structure comprising channelwork having respective tongue and groove members integrally supported by respective ones of said first and second modules about said open side of the second interfitting module, and additional mating interlocking structure comprising support means overlapping said first and second ones of said at least two interfitting modules to form a mechanically supporting joint at the closed back of at least said first one of said at least two interfitting modules, with said tongue and groove members being slidably engaged and disengaged by movement of one of said first and second of said at least two interfitting modules in a direction perpendicular to the closed back of the first said interfitting module to comprise said electrical box frame thereby to comprise with said additional mating interlocking structure a mechanically supported joint at least in part frictionally holding the two mated modules engaged unitarily.

2. The gangable electric box configuration of claim 1 wherein said second one of said at least two interfitting modules comprises a removable sidewall module for closing said open side of said first one of said at least two interfitting modules by forming therewith said mechanically supported joint holding the two mated modules engaged unitarily.

3. The gangable electric box configuration of claim 1 wherein said second one of said at least two interfitting modules comprises an extension box frame having two open sidewalls with said mating interlocking structure thereby extending about both the two open sidewalls of said second one of said at least two interfitting modules.

4. The gangable electric box configuration of claim 1 wherein said electrical box frame comprises an anchor box having disposed on two opposed closed sidewall ends protruding mounting structure for securing said anchor box to a building support body.

5. The gangable electric box configuration of claim 1 wherein said support means overlapping two mated modules to form mechanically supporting joint means comprises flexible plastic members forming a snap-fit detent joint.

6. The gangable electric box configuration of claim 1 wherein said first and second ones of the interfitting modules are metallic with said additional mating interlocking structure support means overlapping said first and second ones of the interfitting modules to form said mechanically supporting joint at said closed back of at least said first one of said at least two interfitting modules comprises a metallic flange registering on the closed back of said electrical box frame adapted for receiving a bond screw to electrically join the electrical box frame of the first one of said at least two interfitting modules and the second of said at least two interfitting modules.

7. The gangable electric box configuration of claim 1 wherein said at least two interfitting modules are molded plastic members.

8. The gangable electric box configuration of claim 1 wherein said first and second interfitting modules are metallic members formed of sheet metal.

9. The gangable electric box configuration of claim 1 wherein said tongue and groove members are substantially cylindrically shaped.

10. The gangable electric box configuration of claim 1 wherein said tongue and groove members extend from the closed back of said first one of said at least two interfitting modules comprising said electrical box frame toward the open front of said quadrilateral electrical box assembly to form an interlocking joint located at four corners of said quadrilateral box assembly, and wherein the tongue and groove members comprise overlapping flange structure forming substantially closed box sidewall structure with said second one of said at least two interfitting modules.

11. The gangable electric box configuration of claim 1 wherein two modular end plates are affixed to said first one of said at least two interfitting modules, wherein the box frame comprises a U-shaped box frame, said tongue and groove members comprising two tongue members on one side of the U-shaped box frame and two receptacle groove members in mating position on the other side of the U-shaped box frame thereby comprising the mechanically supporting joint locking means to hold the end plates and box frame engaged as a stably supported unitary electrical box.

12. The gangable electric box configuration of claim 1 wherein said at least one open side of said first one of said at least two interfitting modules comprising said electrical box frame presents two open box sides with said second one of said at least two interfitting modules comprising said removable electrical box member mateable on said open side of said first one of said at least two interfitting modules to form said mechanically supported joint having said tongue and groove members of said channelwork configured with mating male channelwork tongue members and female channelwork groove members arranged in a configuration permitting a single sidewall module to interfit on both said two open box sides of said electrical box frame.

13. The gangable electric box configuration of claim 12 wherein said second one of said two interfitting modules comprises a closure side panel member.

14. The gangable electric box configuration of claim 12 wherein said second one of said two interfitting modules comprises a substantially quadrilateral expansion box module with two open sides forming a substantially U-shaped member.

15. The gangable electric box configuration of claim 1 wherein said channelwork further comprises said tongue and groove members disposed in four corners of said quadrilateral electrical box assembly.

16. The gangable electric box configuration of claim 1 wherein said first one of at least two interfitting modules forms said electrical box frame in said quadrilateral configuration, and said second one of at least two interfitting modules comprises said removable box module having one open sidewall forming said mating interlocking structure with said quadrilateral open-front electrical box assembly wherein said channelwork is configured to require mating and unmating movement solely in said direction perpendicular to the closed back of the first said interfitting module without lateral movement and requiring no securing members to be entered from outside the open-front quadrilateral configuration, whereby the at least two interfitting modules are structured to permit retrofitting of said removable box module on said at least one open side of said first one of said at least two interfitting modules when said electric box frame having at least one open side is anchored in a building site thereby permitting removal of a said end plate by removal toward said open box front to produce a replacement site for stably mating said removable expansion box module upon said electrical box frame.

17. The gangable electric box configuration of claim 1 wherein said first one and second one of said at least two interfitting modules, comprises at least one electrical box frame module with two open sidewalls forming a U-shaped member, and an interfitting end module, wherein the channelwork disposed upon said at least two interfitting modules is configured to permit said end module to be mounted on both said two open sidewalls.

18. An electric box system forming from a predetermined number of interlocked standard modular parts a unitary electrical box configuration which is particularly adapted for simplified expansion of internal box volume of anchored electrical boxes affixed to a building structural element by formation of a ganged box array with at least one added extension box module interlocked with and supported primarily by the anchored box, comprising in combination:

a set of no more than three basic interfitting modules for producing self standing substantially rectangular open front electrical boxes, said set consisting of an open front U-shaped extension box frame module with two open sides and integrally attached interlocking structure for receiving and supporting on the two open sides end panel modules for forming a substantially rectangular electrical box with closed sides, and a pair of removable end panel modules with integrally attached mating interlocking structure for assembly upon and support by the extension box frame module interlocking structure in a mounting movement perpendicular to said open front and parallel to the side walls without accompanying lateral movement, said interlocking structure on the extension box frame module and the mating interlocking structure on the end panel modules comprising respective tongue and groove shaped female and male members axially aligned to mate the extension box frame with two side closure modular members, the mating interlocking structure being disposed as substantially said tongue and groove members being movably disposed to mate into and out of contiguous side-by-side mated positions in an electrical box array without obstruction of axial movement of the interlocking structure being mated in said mounting movement in the mating process, and intermodular fastening means overlapping contiguous modules for retaining the side closure members in engagement with the frame in a shared support joint.

19. The electric box system of claim 18 further comprising an added expansion box module for forming a substantially rectangular electric box and having anchoring structure carried by at least one expansion box module wall for attachment thereto of an anchoring wire serving as a guy wire when attached to a building element for supplemental support of said electric box system.

20. The electric box system of claim 18 wherein the unitary electrical box configuration further comprises four sidewalls surrounding an open front with an intervening sidewall.

21. The electric box system of claim 18 wherein said set of three basic interfitting modules further consists of two basic modular parts, namely the U-shaped frame module and a single end panel module adapted to interlock with either open side of the frame module.

22. The electric box system of claim 18 wherein the interlocking structure on said frame comprises four rectangularly arranged interlocking members, two being located on each side comprising respectively male and female interlocking members wherein a pair of members disposed toward opposite ends of the box respectively comprise male and female interlocking members, thus arranging two male members and two female members kitti-cornered on the frame module.

23. A multiple ganged modular electric box array, comprising in combination, a plurality of ganged modules including one module of said plurality of ganged modules located at one end of the ganged array comprising an anchor box firmly affixed to a building element, and at least one fanged module of said plurality of ganged modules being ganged to the anchor box by interlocking structure thereby to comprise primary support structure firmly fixing the ganged array to the anchor box, and further comprising secondary support structure integrally carried by an outside wall of said ganged module for anchoring a guy wire extending from said secondary support structure to a predetermined anchoring site.

* * * * *